O. A. TRANA.
ANTISLIPPING DEVICE FOR RESILIENT TIRES.
APPLICATION FILED JAN. 31, 1910.
995,428.
Patented June 13, 1911.
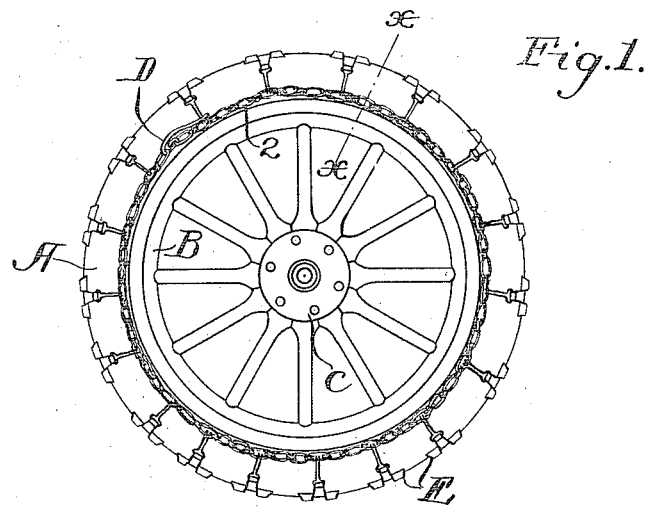
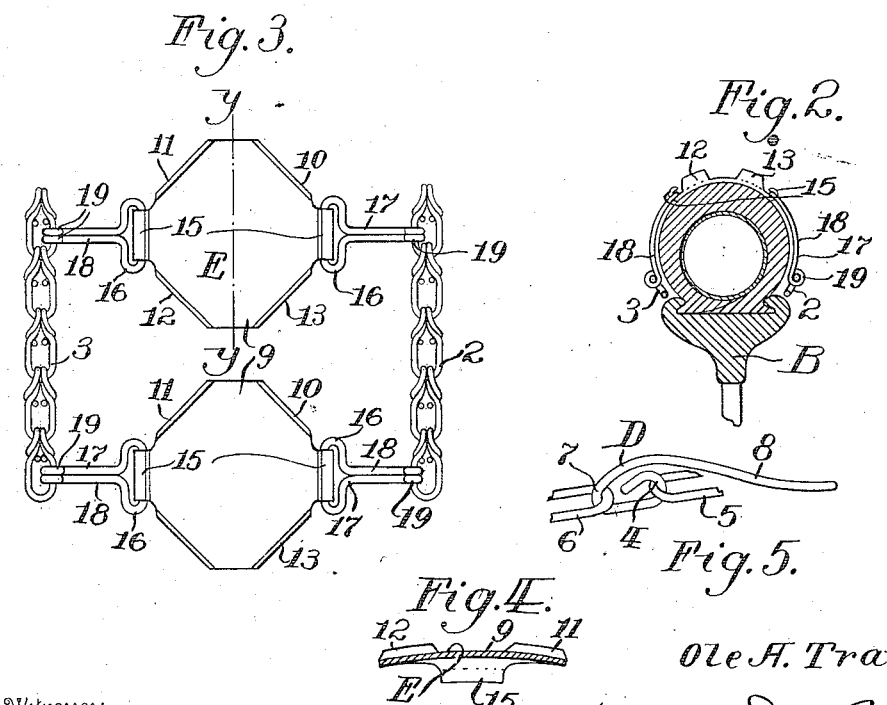
Inventor
Ole A. Trana

UNITED STATES PATENT OFFICE.

OLE A. TRANA, OF ST. PAUL, MINNESOTA, ASSIGNOR OF ONE-HALF TO WILLIAM J. WESTPHAL, OF ST. PAUL, MINNESOTA.

ANTISLIPPING DEVICE FOR RESILIENT TIRES.

995,428.  Specification of Letters Patent.  Patented June 13, 1911.

Application filed January 31, 1910. Serial No. 540,941.

*To all whom it may concern:*

Be it known that I, OLE A. TRANA, a citizen of the United States, residing at St. Paul, in the county of Ramsey and State of Minnesota, have invented a new and useful Improvement in Antislipping Devices for Resilient Tires, of which the following is a specification.

This invention relates to improvements in antislipping attachments for tires of vehicles and more particularly is adapted for use upon pneumatic or cushioned tires.

The primary object of this invention is to provide improved means which can be easily and quickly applied to the traction or driving wheels of automobiles by anyone skilled or unskilled when needed, and which will effectively prevent slipping of the tires upon smooth, wet and icy pavements or muddy roads.

A further object is to provide means for accomplishing the results above stated without unduly wearing the surface of the tires and which will protect the surface of the tire from puncture or abrasion when in use.

With these and other objects in view my invention comprises strong, durable and inexpensive construction which is simple and not liable to disorder.

I am aware that prior to my invention antislipping attachments for pneumatic tires have been used which are composed of parallel side chains disposed lengthwise of the tire and a plurality of cross chains secured to said side chains and passed back and forth across the tires at suitable intervals. I am also aware that the cross chains mentioned have been provided with cups, the intention, by the use of which is to provide a gripping member which will more effectively impinge upon the pavement. These constructions are ineffective and inefficient and do not accomplish the results desired. In the first place the chain construction cuts into and wears the tire and in the cup construction the gripping member is not self cleaning, wears the tire, slips, and in consequence clogs, and renders the device detrimental. In the present invention gripping members are employed each of which is formed by a concave plate fitting over the tire and forming a suction connection when in use, said plate being provided with flanges set at angles which effectively bite into the pavement, prevent lateral movement of the wheel and at the same time cleans the plate of any mud or ice that may tend to adhere upon its surface.

In the accompanying drawings forming part of this specification, Figure 1 is a side elevation of a pneumatic tire and a wheel with an antislipping attachment applied thereto embodying the features of this invention; Fig. 2 is a cross section of a portion of Fig. 1 taken upon the line X—X; Fig. 3 is an enlarged fragmentary top plan view of the antislipping attachment when removed; Fig. 4 is a longitudinal section of one of the shoes or gripping elements taken upon the line Y—Y of Fig. 3, and Fig. 5 is a perspective view enlarged, of the locking element for securing the ends of the longitudinal chains together.

In the practice of this invention a pair of circumferential elements preferably although not necessarily in the form of flexible chains 2 and 3 or cables are arranged on opposite sides of the pneumatic tire A immediately adjoining the rim B of the wheel C the ends of each chain being secured together by a locking element D in the form of a hook, one end of which is formed with an eye 4 secured to an end link 5 of a chain and the other end of the locking element being hooked through the link 6 on the opposite end of said chain, the hook portion 7 of the lock being turned back and formed with an extension 8 which may be used as a handle. In use this handle is thrust through the link 6 and turned back into the position illustrated in Fig. 5 thus drawing the chain tightly in place upon the wheel and tending to hold the ends of the chain in said position without danger of separating.

Disposed at suitable and preferably regular intervals upon the periphery of the tire A are a plurality of my improved gripping devices E each of which is in the form of a shoe. This shoe consists of a thin plate 9 of metal or other suitable material which is concaved laterally and longitudinally for the purpose of forming a suction attachment on the surface of the tire, the radius of the longitudinal curve of said shoe being less than the radius of the periphery of the tire on which it is used. The radius of the transverse curve of the shoe is approximately the same as or less than the radius of the curve of the tire in cross section. The longitudinal end portions of the shoe are formed with upturned flanges 10, 11, 12 and 13 which are disposed longitudinally at substantially forty five degrees to the center line of the shoe, the end portions of said flanges being spaced apart, whereby any mud, snow or ice adhering to the shoe is free to slide out from between the flanges. The sides of the shoe plate between the side ends of each pair of flanges are formed into loops 15 which engage through elongated eyelets 16 on fasteners 17. The loops 15 turn in over the surface of the tire. Each fastener as illustrated consists of a single piece of wire bent midway between its ends into elongated eyelets 16. The ends of this wire are brought together and form a shank 18 the outer extremity of which is fastened to a link of the side chains through eyes 19. The shank 18 bows outwardly to substantially conform with the surface of the tire as illustrated in Fig. 2. The fasteners 17 thus form rigid connections between the shoes and the chains, such connections being permissible and advantageous on account of the suction engagement between the shoe and the surface of the tire. The side chains 2 and 3 are flexible and permit a limited amount of movement of the shoes and their fasteners and the joint between the fasteners and the shoe being hinged as illustrated also permits the requisite amount of movement due to the weight of the superimposed load on the tire.

In assembling this apparatus upon a wheel or tire, the tire need not be deflated the side chains being tightly drawn in place and held securely by the fasteners D with the shoes disposed over the perimeter of the tire as illustrated in Fig. 1. The angle at which the flanges 10 and 11 are disposed is the most efficient and effective for producing a grip which will assist in preventing the wheel from slipping either longitudinally or transversely and the open spaces left between the forward and side ends of the flanges causes the shoe to clean and rid itself of any earth, ice or snow that may tend to adhere thereto and prevent the efficient and effective operation of the invention.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An antislipping device for resilient tires, comprising, circumferential side chains, a plurality of shoes disposed at intervals between said side chains and connections between said chains and shoes, each of said shoes consisting of a plate having upturned flanges formed at an oblique angle to the plane of the wheel and spaced apart at the forward and rearward edges of the plate to form a clearance passageway.

2. An antislipping device for resilient tires, comprising, a pair of parallel side chains spaced apart, a plurality of shoes disposed at longitudinal intervals between said chains and attached thereto, each shoe consisting of a concave plate with its concavity turned down over the periphery of the tire, said plate having flanges turned up therefrom at an oblique angle to the plane of the wheel, said upturned oblique edges being truncated to form an open end at the two ends of said shoes, the sides of said shoe being formed with a hinged connection, and a pair of fasteners secured to said side chains and hinged to said shoe.

3. An antislipping device for resilient tires, comprising, a shoe plate of octagonal shape, those edges thereof which are at an oblique angle to the plane of the wheel being upturned at a right angle to form gripping flanges, and those opposite edges of which are parallel to the plane of said wheel being formed with engaging loops, a pair of side chains between which said shoe plate is disposed and connections between said loops on said shoe and side chains.

In testimony whereof, I have signed my name to this specification in the presence of two subscribing witnesses.

OLE A. TRANA.

Witnesses:
 JULE DONOVAN,
 F. G. BRADBURY.